(12) United States Patent
Johnson

(10) Patent No.: US 10,863,671 B2
(45) Date of Patent: Dec. 15, 2020

(54) UNLOADING CONVEYOR SWING CONTROL SYSTEM

(71) Applicant: AGCO Corporation, Duluth, GA (US)

(72) Inventor: Gerald R. Johnson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 494 days.

(21) Appl. No.: 15/828,793

(22) Filed: Dec. 1, 2017

(65) Prior Publication Data
US 2019/0166759 A1    Jun. 6, 2019

(51) Int. Cl.
*A01D 41/12*    (2006.01)
(52) U.S. Cl.
CPC .............................. *A01D 41/1217* (2013.01)
(58) Field of Classification Search
None
See application file for complete search history.

(56) References Cited

U.S. PATENT DOCUMENTS

| 6,981,833 B2 | 1/2006 | Guhr et al. |
| 8,367,956 B2 | 2/2013 | Hetzer et al. |
| 2002/0017088 A1 | 2/2002 | Dillon |
| 2013/0096782 A1* | 4/2013 | Good ................. A01D 41/1217 701/50 |
| 2014/0090958 A1 | 4/2014 | Mulder et al. |
| 2015/0156968 A1* | 6/2015 | Lauwers ................. A01F 12/60 56/10.2 R |

FOREIGN PATENT DOCUMENTS

| EP | 1640512 A2 | 3/2006 |
| EP | 2028320 | * 2/2009 |
| EP | 2028320 A1 | 2/2009 |
| GB | 2491855 A1 | 12/2012 |
| WO | 2016/079580 A1 | 5/2016 |

OTHER PUBLICATIONS

UK Intellectual Property Office, International Search Report for related UK Application No. GB1722250.6, dated Jun. 27, 2018. (previously submitted Jul. 12, 2018).

* cited by examiner

*Primary Examiner* — Mark C Hageman

(57) ABSTRACT

An unloading conveyor of an agricultural harvesting machine is pivotably mounted to a frame for pivoting movement through a movement range that is defined between first and second end positions. Movement of the unloading conveyor within the movement range is controlled by movement of a user-actuated scroll wheel.

20 Claims, 6 Drawing Sheets

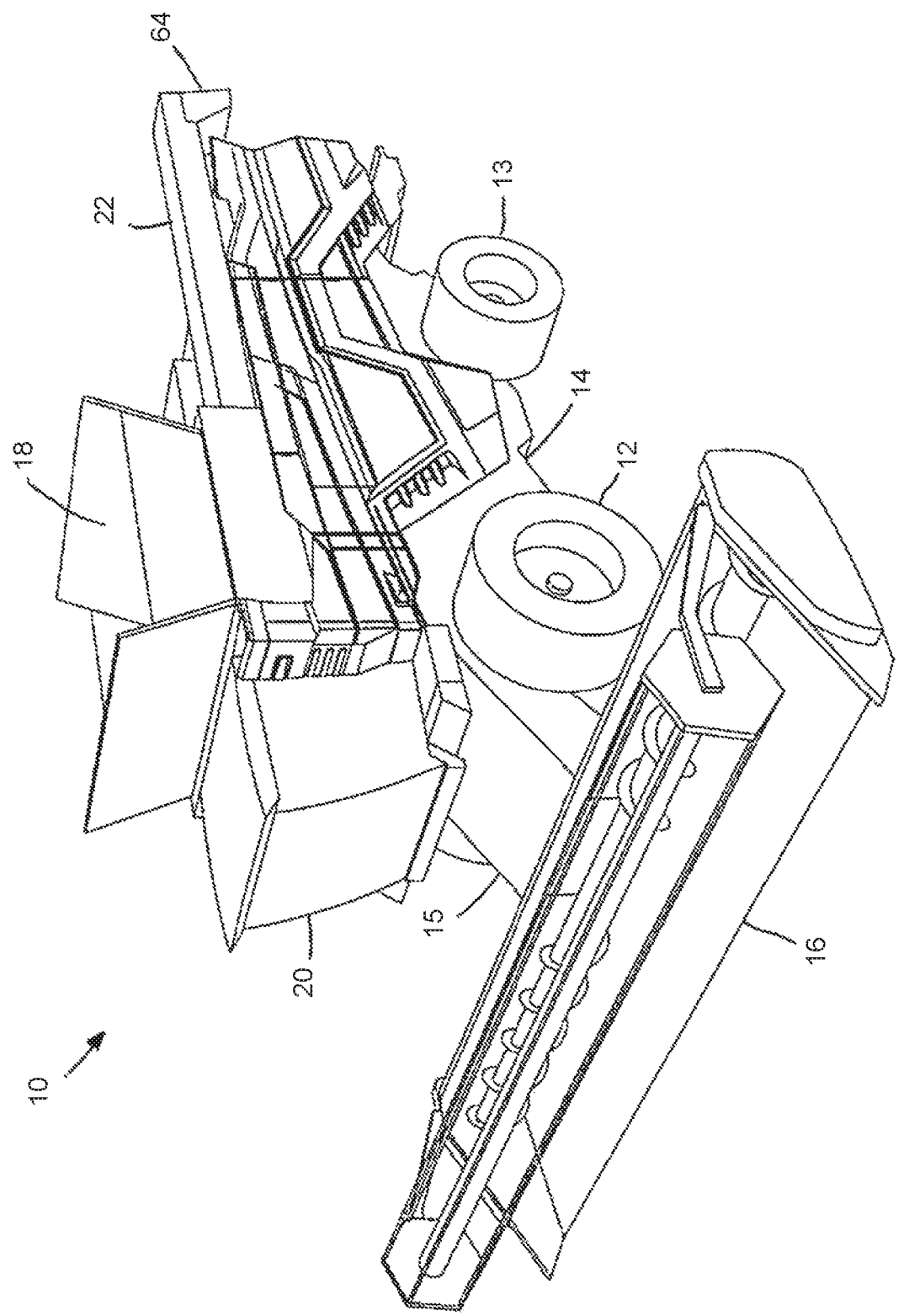

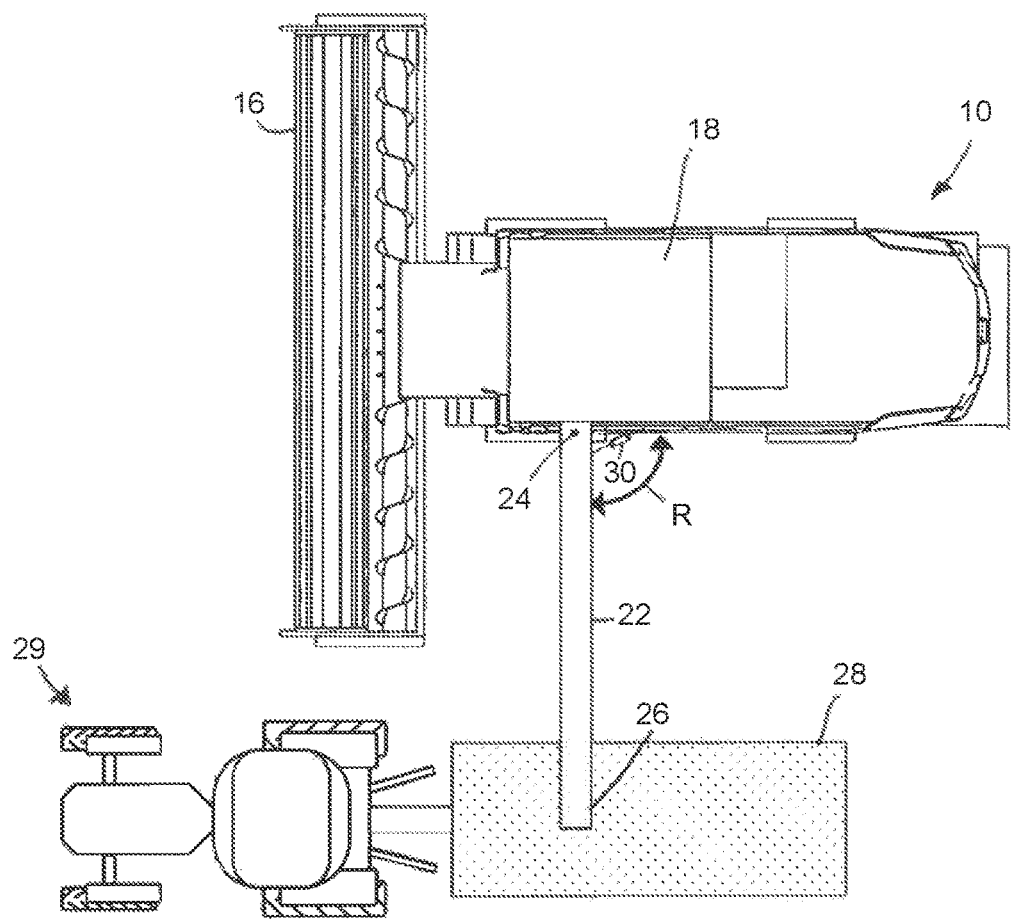
*Fig. 2A*
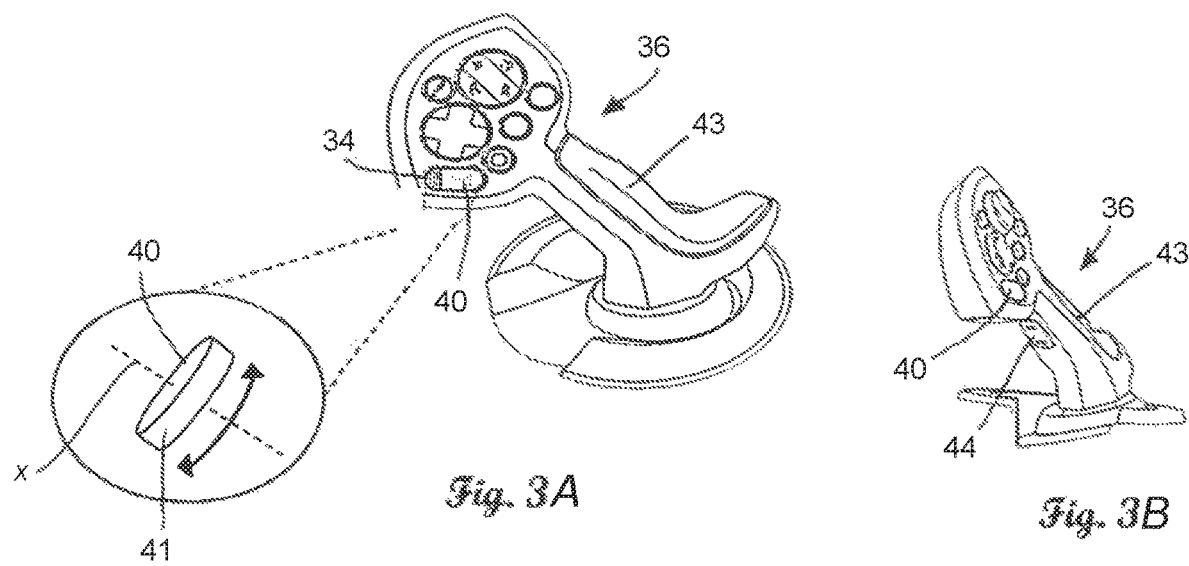
*Fig. 3A*  *Fig. 3B*

UNLOADING CONVEYOR SWING CONTROL SYSTEM

BACKGROUND OF THE INVENTION

Field of Invention

The invention relates to agricultural harvesting machines which comprise unloading conveyors that are swingable around a pivot axis between a transport position and a, deployed, unloading position. In particular the invention relates to control systems for controlling the movement of unloading conveyors.

Description of Related Art

Agricultural harvesting machines include combine harvesters, forage harvesters and sugar cane harvesters by way of example. A header is employed to cut a standing crop or pick up a windrowed crop before gathering and processing the crop in a manner which depends upon the given machine. A combine harvester for example serves to thresh, separate and clean grain before collecting the grain in an on-board tank. The grain is periodically discharged to a grain cart via an unloading conveyor. Other harvesters, such as forage harvesters, discharge the crop via an unloading conveyor continuously throughout harvest.

Unloading conveyors traditionally comprise an auger (or screw conveyor) inside a tube. However, other types of conveyor are known such as belt unloaders or blowers. The unloading conveyor is normally swingable between a stowed (or transport) position and a deployed (or unloading) position. In the stowed position the conveyor extends along the side of the harvester so as not to exceed the maximum permitted width on the highway or to avoid in-field obstacles such as trees or pylons. In the deployed position the conveyor extends substantially transversely away from the harvester in order to reach a cart which is driven alongside during unloading.

The process of unloading commonly occurs simultaneously with the process of harvesting and so the driver of the harvester is often required to pay attention to both the harvesting process and the unloading process at the same time. The relative position of the unloading conveyor and the cart can be adjusted by varying the harvester forward speed, the cart forward speed or the swing angle of the unloading conveyor, wherein the latter option is normally preferred because it does not affect the harvest process and the harvester driver has a better view of the cart. 'Topping off' the cart when nearly full can be especially challenging when also concentrating in the forward direction on the harvest process. As such there is a desire to improve the ergonomics associated with controlling the unloading conveyor position.

The position of the unloading conveyor is normally controlled by the harvester driver via a user interface device located in the driver's cab. In one known example, the position is controlled by an extend button and a retract button which are operable by the harvester driver. These buttons may also be used during unloading to refine the position of the conveyor precisely with respect to the cart in order to "top off" the cart and avoid spillage. U.S. Pat. No. 6,981,833 discloses a control system which includes such buttons. Furthermore, a latched mode is provided which allows the conveyor to be completely stowed or deployed even when pressure is removed from the respective button.

SUMMARY OF THE INVENTION

According to one aspect of the invention there is provided an agricultural harvesting machine which comprises an unloading conveyor pivotably mounted to a frame for pivoting movement through a movement range defined between first and second end positions. A control system is configured to produce controlled movement of the unloading conveyor within the movement range in response to a user input signal. The control system comprises a scroll wheel device arranged to generate the user input signal.

Advantageously, the disclosed embodiment delivers improved ergonomics for controlling the position of the unloading conveyor with an intuitive relationship between actuation of the scroll wheel and movement of the conveyor.

BRIEF DESCRIPTION OF THE DRAWINGS

Preferred embodiments of the invention are described in detail below with reference to the attached drawing figures, wherein:

FIG. 1 is a perspective view of an agricultural harvesting machine in the form of a combine harvester.

FIG. 2A is an overhead schematic view of the combine harvester of FIG. 1 and a tractor-hauled grain cart during unloading.

FIGS. 3A and 3B are perspective views of a joystick which includes a scroll wheel and forms part of a control system in an embodiment of the invention.

Figure 2B:
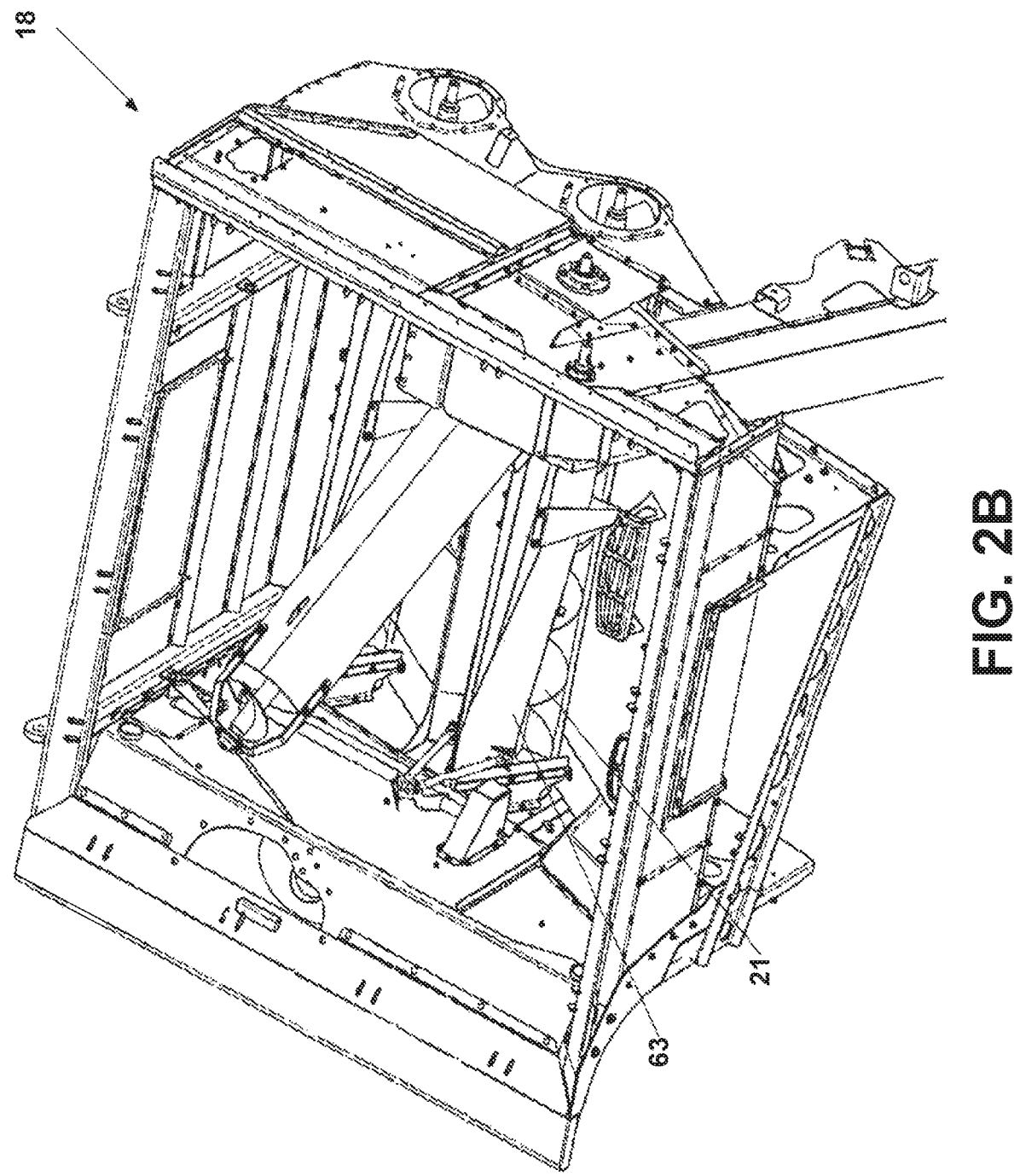
FIG. 2B shows the grain delivery conveyor which moves grain from the grain bin to the unloading conveyor.

The drawing figures do not limit the present invention to the specific embodiments disclosed and described herein.

DETAILED DESCRIPTION

Specific embodiments of the invention will now be described with reference to the drawings. FIG. 1 shows an agricultural harvesting machine in the form of a combine harvester 10. Principals of aspects of the invention will be described hereinafter with reference to embodiment in a combine harvester. However, it should be understood that aspects of the invention can be embodied in other agricultural harvesters including, by way of example only, forage harvesters and sugar cane harvesters.

Combine harvester 10 includes ground engaging means in the form of front and rear wheels 12,13. A frame is designated generally at 14 and supports at its front end, upon a feederhouse 15, a cutting header 16. The core or body of the machine includes crop processing apparatus (hidden from view) which normally includes, in the case of a combine harvester, threshing apparatus, separating apparatus and a grain cleaning system. In other types of harvesting machine the crop processing apparatus may differ. For example, a forage harvester will normally include, inter alia, crop processing rollers.

Turning back to the combine harvester 10, an on-board grain bin 18 provides a compartment to store the collected grain before unloading into a grain cart via an unloading system to be described in more detail below. It should be appreciated that other types of harvesting machine may not include an on-board bin.

The combine harvester 10 further comprises a drivers cab 20 from which the driver operates the harvester 10 with various user input devices. A control unit (to be described in more detail below) is located in the cab 20 in one embodiment.

Figure 2C:
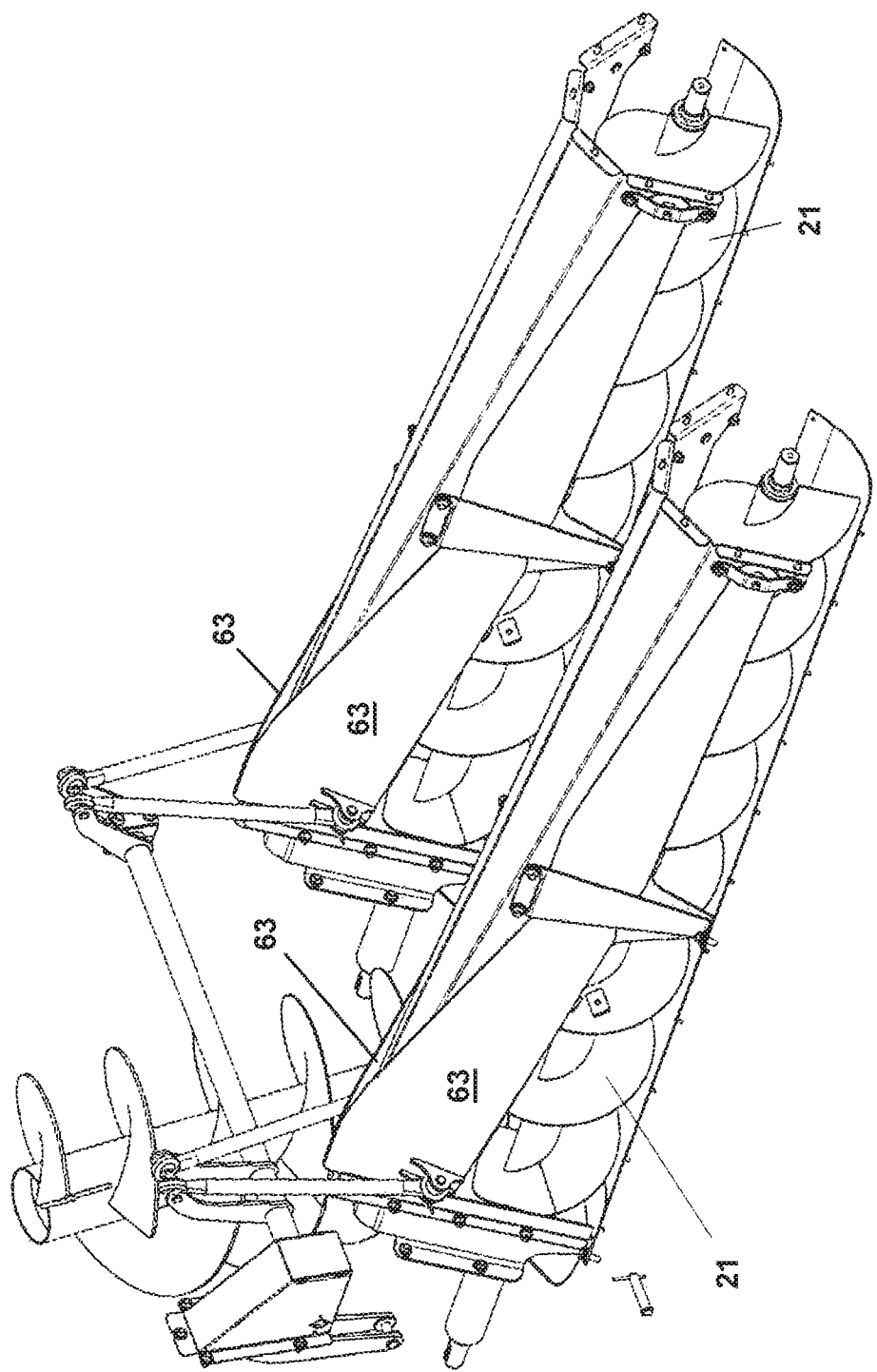
FIG. 2C shows the moveable restricting grates and grain delivery conveyor.

With reference also to FIG. 2, the unloading system includes an unloading conveyor 22 which is pivotably mounted to the frame 14 for pivoting movement around an upright axis 24 through a movement range which is indicated by arrow R. In a first end (or stowed or transport) position (FIG. 1) the unloading conveyor 22 is aligned generally longitudinally and resides alongside the body of harvester 10. In a second end (or deployed or unloading) position (FIG. 2) the unloading conveyor 22 extends transversely away from the pivot axis 24 so that the discharge end 26 can be positioned above a grain cart 28, which is, in this embodiment at least, towed by an agricultural tractor 29 as is common in the art today. The unloading conveyor 22 can be positioned at any angle between the first and second end positions.

Although shown as being at a right-angle with respect to the longitudinal axis of the harvester 10 when in the second end position, the unloading conveyor 22 in an alternative embodiment may swing beyond 90 degrees so that the unloading conveyor 22 is angled forwardly to a limited extent. Furthermore, although shown as a turret-style unloading conveyor with a substantially upright pivot axis, the conveyor shown may be substituted with other types of unloading conveyor such as swivel-type conveyors that pivot around an axis that is angled with respect to vertical.

The unloading conveyor 22 in one embodiment is a screw conveyor (or auger) inside a tube as is well known. In alternative embodiments the unloading conveyor may be a belt unloader or a blower for example.

An actuator 30 is connected between the unloading conveyor 22 and the frame 14 and serves to control swing movement of the unloading conveyor 22 between the first and second end positions. In one embodiment the actuator 30 is a hydraulic actuator but electric actuators can be employed instead.

A control system 32 (FIG. 4) is configured to produce controlled movement of the unloading conveyor 22 within the movement range R in response to a user input signal which is generated by a scroll wheel device 34. With reference to FIG. 3a, in the illustrated embodiment the scroll wheel device 34 is embodied in a control handle 36 or joystick which is positioned within comfortable reach of the harvester driver inside the cab 20, for example on a console adjacent a driver's seat (not shown). The scroll wheel device 34 is located on a front side 37 of the control handle 36 facing the driver. Other user interface devices in the form of buttons and switches may also be provided on the front side 37 of the control handle 36 to control other functions of the harvester 10.

The scroll wheel device 34 comprises a user-actuated scroll wheel 40 which is alike to scroll wheels used in mouse devices for computers. The scroll wheel 40 is continuously rotatable on an axis 'x' and may include a textured or 'ribbed' circumferential surface 41 to present a gripping surface for easy engagement by the operator's thumb or finger. Depending upon the layout of the various user interface devices on the control handle 36, the scroll wheel 40 may be positioned for convenient actuation by the operators thumb or finger.

In one embodiment a press-actuated control switch 42 is integrated into the scroll wheel device 34 in a manner akin to known scroll wheels used on mouse devices. The switch 42 is actuated by pressing the scroll wheel 40 in a radial direction with respect to axis 'x'. The function assigned to the switch 42 will be described in more detail below.

The control handle 36 includes also a hand-grip portion 43 and a press-actuated control switch 44 on the rear side thereof, as shown in FIG. 3b. The switch 44 may be a double switch or a single switch. It should be appreciated that the control handle 36 may function also as a joystick wherein user-controlled movement of the control handle 36 is sensed and converted into driver commands in relation to propulsion of the harvester 10 for example.

The control system 32 comprises the control unit 46 which includes control circuitry 48 which may be embodied as custom made or commercially available processor, a central processing unit or an auxiliary processor among several processors, a semi-conductor based micro-processor (in the form of a micro-chip), a macro processor, one or more applications specific integrated circuits, a plurality of suitably configured digital logic gates, and/or other well-known electrical configurations comprising discrete elements both individually and in various combinations to coordinate the overall operation of the harvester 10.

The control unit 46 further comprises memory 50. The memory 50 may include any one of a combination of volatile memory elements and non-volatile memory elements. The memory 50 may store a native operating system, one or more native applications, emulation systems, emulated applications for any of a variety of operating systems and/or emulated hardware platforms, emulated operating systems etc. For example, control of the actuator 30 may be implemented through software or firmware executing on a processor of the control circuitry 48. The memory 50 may be separate from the control unit 46 or may be omitted.

The scroll wheel device 34 communicates with the control unit 46 via a data bus 52 using electronic signals. The data bus 52 may be a wired connection, a wireless connection, or a hybrid of wired and wireless connections.

The combine harvester 10 includes a conveyor drive system 60 coupled to the unloading conveyor 22. A grain delivery conveyor 21 is arranged to deliver grain from the grain bin 18 to the unloading conveyor 22. The conveyor drive system 60 is selectively engaged to drive the grain delivery conveyor 21 and the unloading conveyor 22 during an unloading process. In one embodiment the conveyor drive system comprises a clutch (not shown) which is selectively engaged during unloading. The conveyor drive system 60 communicates with the control unit 46 via the data bus 52. In one embodiment the conveyor drive system 60 is selectively activated and deactivated by actuation of the press button 42. Alternatively, the conveyor drive system 60 is selectively activated and deactivated by actuation of the control switch 44.

The combine harvester 10 further comprises a flow control system 62 provided in association with the grain delivery conveyor 21. The flow control system 62 may be constructed in a manner akin to that disclosed by WO-2016/193800 the contents of which are incorporated herein by reference. As such, the flow control system 62 may comprise one or more movable gates 63 that restrict the flow of grain to or within the grain delivery conveyor 21, wherein movement of the gates 63 is controlled by the control unit 46.

A discharge spout 64 (FIG. 1) is mounted to the discharge end 26 of the unloading conveyor 22 so that the spout 64 can be moved around one or two axes with respect to the conveyor 22. A spout control actuator 66 is connected between the spout 64 and the conveyor 22, wherein the actuator 66 is arranged to control movement of the spout 64 in response to signals generated by, and received from, the control unit 46.

The control system 32 may also be in communication with a grain cart control system 68 which serves to control one or more driving parameters of the tractor 29 and grain cart 28 combination during an unloading process. The driving parameters controlled may include, by way of example only, the forward speed of the tractor 29, and the relative longitudinal or transverse position of the grain cart 28 with respect to the discharge end 26 of the unloading conveyor 22.

Having described the hardware of the illustrated embodiment, the functionality of the control system 36 in conjunction with the various systems controlled thereby will now be described.

In accordance with an aspect of the invention the control system 32 is configured to produce controlled movement of the unloading conveyor 22 within the movement range R in response to user input signals generated by the scroll wheel device 34 which is actuated by the operator or driver. The scroll wheel device 34 is arranged to generate a scroll speed signal in response to user-actuation of the scroll wheel 40, wherein the scroll speed signal has a value $s_m$ that is representative of the measured or sensed speed that the scroll wheel 40 is rotated by the operator. The scroll speed $s_m$ may be, for example, represented by an integer or analogue parameter. The parameter preferably also represents scroll direction. For example, a positive integer may represent right-hand direction scroll movement while a negative integer represents left-hand direction scroll movement. The greater the absolute value of the parameter, the greater the scroll speed. It should be appreciated, that depending upon the orientation of the scroll wheel 40 on the control handle 36, the scroll direction may be better described as up/down rather than right/left.

The scroll speed signal is communicated to the control unit 46 which is configured to control movement (direction and swing angle) of the unloading conveyor 22 dependent upon the scroll speed signal. Movement of the unloading conveyor 22 is controlled by command signals which are generated by the control unit 46 and communicated to hydraulic valves (not shown) associated with controlling the unloading conveyor actuator 30. The command signals may be modulated to control the extent or angle of swing movement.

In one embodiment the control system 32 is operable to swing the unloading conveyor 22 outwardly (away from the stowed position) in response to user-actuation of the scroll wheel 40 in a first direction, for example left-hand direction scroll movement. Furthermore, the control system 32 may be operable to swing the unloading conveyor 22 inwardly (toward the stowed position) in response to user-actuation of the scroll wheel 40 in a second direction, for example right-hand direction scroll movement.

In one embodiment illustrated by the flowchart of FIG. 4, the control unit 34 is arranged to disregard or ignore the scroll speed signal when the absolute (sensed) scroll speed $|s_m|$ is below a trigger threshold value $s_1$. By ignoring sensed scroll actuations that are below the trigger threshold value, accidental or minor unintentional movements of the scroll wheel 40 do not affect movement of the unloading conveyor 22.

If the scroll speed is sensed as being above the trigger threshold value $s_1$, but below an 'auto-initiate' threshold value $s_2$, then movement of the unloading conveyor 22 is initiated in the 'Manual' mode in the direction determined by the direction of scroll movement. In the manual mode movement of the unloading conveyor is stopped by the control system 32 when the user-actuation of the scroll wheel 40 is stopped, or at least when the scroll speed falls below the trigger threshold $s_1$. This allows the operator to 'fine-tune' or control the position of the unloading conveyor incrementally with an ergonomically-friendly, direct positional relationship between movement of the scroll wheel 40 and movement of the unloading conveyor 22. The manual mode is particularly convenient when 'topping off' the grain cart as it nears full status.

Figure 4:
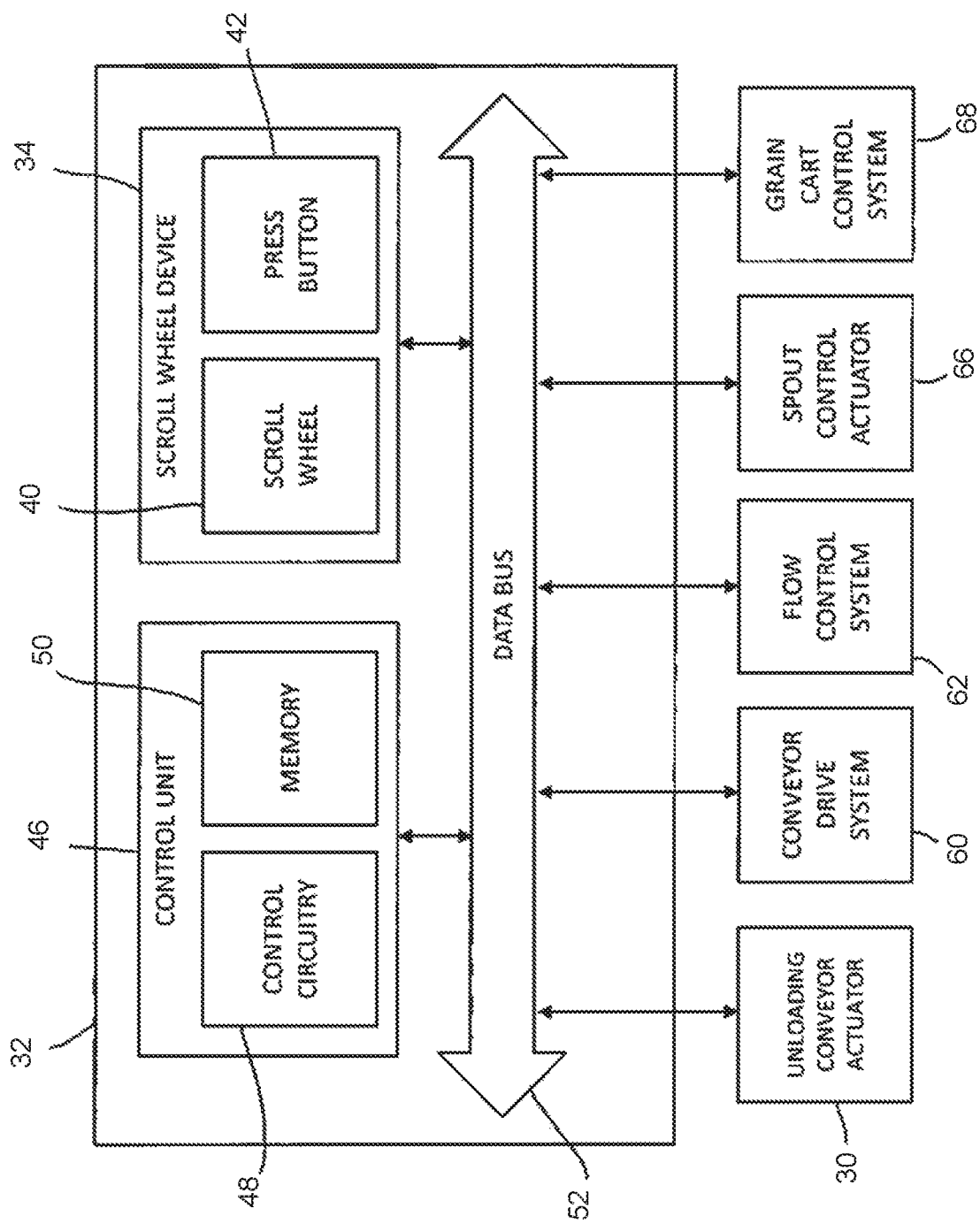
FIG. 4 is a block diagram of combine harvester according to an embodiment of the invention.
Figure 5:
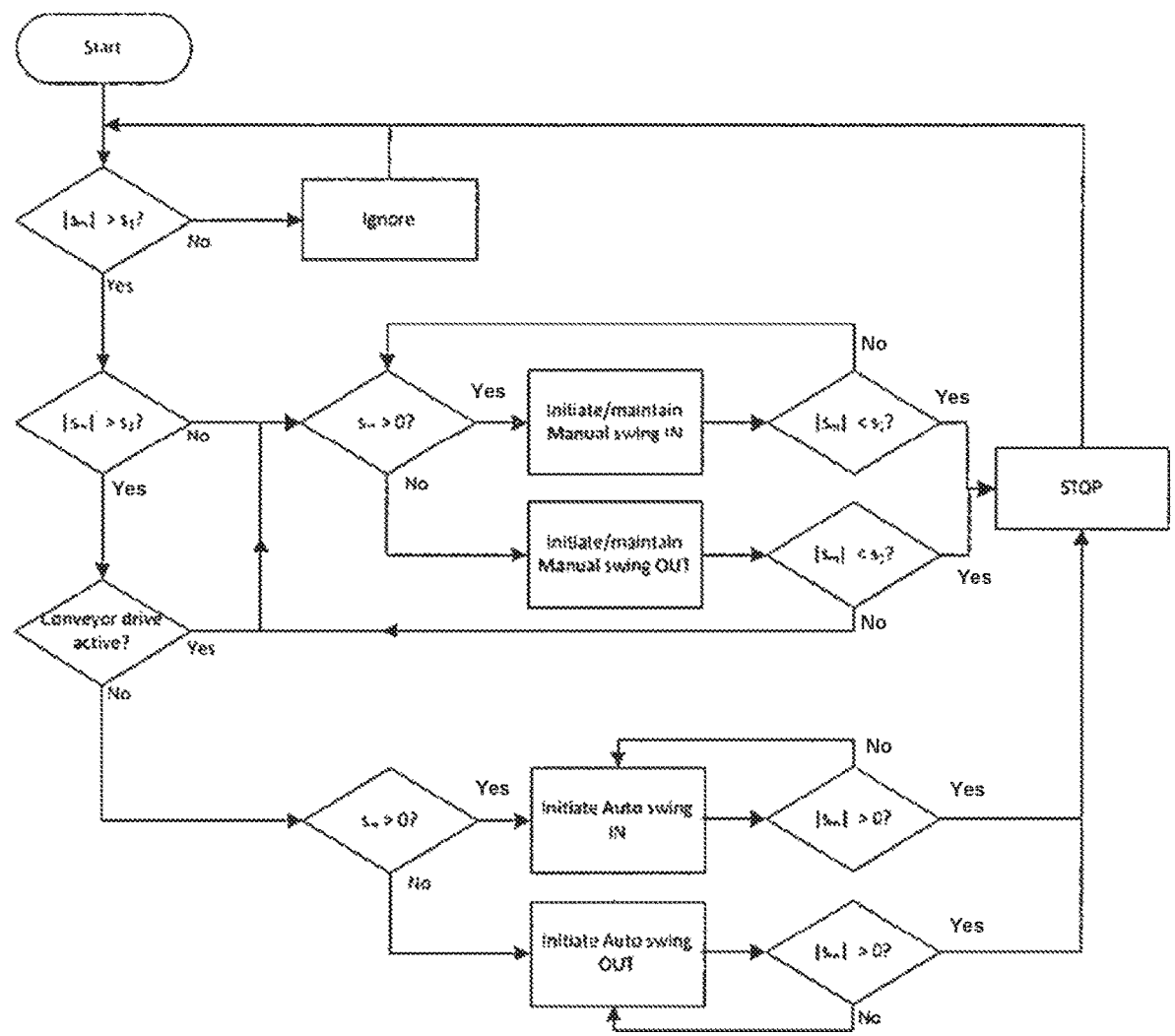
FIG. 5 is a flowchart illustrating a method of controlling an agricultural harvesting machine in accordance with an embodiment of the invention.

With reference to FIG. 4, if the scroll speed value is a negative value (left-hand direction scrolling) then the unloading conveyor is swung out. If the scroll speed value is a positive value (right-hand direction scrolling) then the unloading conveyor is swung in.

If the scroll speed is sensed as being above the 'auto-initiate' threshold value $s_2$, AND the conveyor drive system 60 is detected as being inactive, then movement of the unloading conveyor 22 is initiated by the control system 32 in the 'Automatic' mode in the direction determined by the direction of scroll movement. In the automatic mode movement of unloading conveyor 22 is continued after actuation of the scroll wheel 40 is stopped and until the unloading conveyor 22 is detected or calculated as having reached a predefined position OR that actuation of the scroll wheel has restarted.

The automatic mode provides an option for the operator to swing the unloading conveyor out or in to a predefined position with a simple single rapid actuation of the scroll wheel 40. One predefined position in a preferred embodiment is the first end (stowed) position. A second predefined position may correspond to the second (deployed) position or to an angle of substantially 90°.

When moving in the automatic mode, movement of the unloading conveyor 22 is stopped in response to any subsequent movement of the scroll wheel 22. This provides the operator with the peace of mind that the movement can be stopped simply and quickly if required.

In an alternative embodiment to that illustrated in FIG. 4, and depending upon the button assigned to selective activation of the conveyor drive system 60, the operator may switch the control system 32 between the manual mode and the automatic mode of operation by actuation of the press button 42. In yet another alternative embodiment, the operator may switch the control system 32 between the manual mode and the automatic mode of operation by actuation of the control switch 44.

In one embodiment the control system 32 is operable in a flow control mode in which the flow control system 62 is controlled by the control system 32 in response to user input signals generated by the scroll wheel device 34, and particularly the scroll wheel 40. The flow control mode is especially useful to the operator during an unloading process in which the unloading conveyor 22 is already deployed and wherein the scroll wheel 40 can be actuated to control flow control gates 63 so as to regulate the supply of grain to the grain delivery conveyor 21. In one example, the flow control mode may activate automatically when the conveyor 22 is deployed and the conveyor drive system 60 is activated.

In another embodiment the control system 32 is operable in a spout control mode in which the spout control actuator 66 is controlled by the control system 32 in response to user input signals generated by the scroll wheel device 34 and particularly the scroll wheel 40. The spout control mode is especially useful to the operator during an unloading process in which the unloading conveyor 22 is already deployed and wherein the scroll wheel 40 can be actuated to control the direction of grain discharge through the spout 64. In one example, the spout control mode may activate automatically when the conveyor 22 is deployed and the conveyor drive system 60 is activated.

In accordance with another aspect of the invention a method of controlling the combine harvester 10 and cart unit 28,29 during an unload event is provided, wherein the control system 32 is operable in a cart control mode positioning commands are generated in dependence upon user input signals generated by the scroll wheel device 34, particularly the scroll wheel 40. In the cart control mode, the operator may control one of the forward speed of the grain cart 28 and relative longitudinal position between the combine 10 and cart 28 using the scroll wheel 40. As such, in the cart control mode, control of the speed and/or steering of the tractor 29 may be done by the control unit 46 located on the combine 10.

From reading the present disclosure, other modification will be apparent to persons skilled in the art. Such modifications may involve other features which are already known in the field of agricultural harvesting machines and component parts therefore and which may be used instead of or in addition to features already described herein.

What is claimed is:

1. An agricultural harvesting machine comprising:
    an unloading conveyor pivotably mounted to a frame for pivoting movement through a movement range defined between first and second end positions;
    a control system configured to produce controlled movement of the unloading conveyor within the movement range in response to a user input signal, wherein the control system comprises a scroll wheel device arranged to generate the user input signal;
    wherein the scroll wheel device comprises a user-actuated scroll wheel, and wherein the control system is operable to move the unloading conveyor in a first swing direction in response to user-actuation of the scroll wheel in a first scroll direction, and to move the unloading conveyor in a second swing direction in response to user-actuation of the scroll wheel in a second scroll direction opposite to the first scroll direction;
    wherein the control system is operable in a manual mode wherein movement of the unloading conveyor is stopped by the control system in response to user-actuation of the scroll wheel being stopped, and the control system is further operable in an automatic mode wherein movement of the unloading conveyor is continued by the control system after actuation of the scroll wheel is stopped and until detection by the control system that the unloading conveyor has reached a predefined position or that actuation of the scroll wheel has restarted; and
    wherein the scroll wheel device is arranged to generate a scroll speed signal in response to user-actuation of the scroll wheel, wherein the scroll speed signal has a value that is representative of the scroll speed, and wherein the control system is configured to control the movement of the unloading conveyor dependent upon the scroll speed signal.

2. The harvesting machine of claim 1, wherein the control system is configured to operate in the manual mode when it determines that the scroll speed is below a predetermined first threshold value.

3. The harvesting machine of claim 2, wherein the control system is arranged to disregard the scroll speed signal when the scroll speed is below a predetermined second threshold value that is below the first threshold value.

4. The harvesting machine of claim 2, wherein the control system is configured to initiate the automatic mode when it determines that the scroll speed is above the predetermined first threshold value.

5. The harvesting machine of claim 1, wherein the control system further comprises a press-actuated control switch for switching the control system between manual mode operation and automatic mode operation.

6. The harvesting machine of claim 5, wherein the press-actuated control switch is integrated into the scroll wheel device.

7. The harvesting machine of claim 5, wherein the control system comprises a control handle which includes the scroll wheel device on a front side and the press-actuated control switch on a rear side.

8. The harvesting machine of claim 1, further comprising a conveyor drive system coupled to the unloading conveyor.

9. A combine harvester comprising a harvesting machine according to claim 8.

10. The combine harvester of claim 9, wherein the control system further comprises a press-actuated control switch for activating the conveyor drive system.

11. The combine harvester of claim 10, wherein the press-actuated control switch is integrated into the scroll wheel device.

12. The combine harvester of claim 10, wherein the control system comprises a control handle which includes the scroll wheel device on a front side and the press-actuated control switch on a rear side.

13. The combine harvester of claim 9, further comprising:
    a grain bin;
    a grain delivery conveyor arranged between the grain bin and the unloading conveyor; and
    a flow control system configured to selectively move at least one restrictor gate in the grain delivery conveyor;
    wherein the control system is operable in a flow control mode wherein the flow control system is controlled by the control system in response to user input signals generated by the scroll wheel device.

14. The combine harvester of claim 13, wherein the flow control mode is activated in the control system when the conveyor drive system is activated.

15. The combine harvester of claim 8, further comprising a discharge spout mounted to a discharge end of the unloading conveyor, wherein the discharge spout is movable with respect to the unloading conveyor by a spout control actuator, and wherein the control system is operable in a spout control mode wherein the spout control actuator is controlled by the control system in response to user input signals generated by the scroll wheel device.

16. The combine harvester of claim 15, wherein the spout control mode is activated in the control system when the conveyor drive system is activated.

17. A method of controlling a harvesting machine according to claim 1 and a crop-receiving cart unit during an unload event, wherein the control system is operable in a cart control mode wherein cart positioning commands are generated in dependence upon user input signals generated by the scroll wheel device.

18. A harvesting machine comprising:
an unloading conveyor pivotably mounted to a frame for pivoting movement through a movement range defined between first and second end positions; and
a control system configured to produce controlled movement of the unloading conveyor within the movement range in response to a user input signal, the control system comprising:
a scroll wheel device arranged to generate the user input signal; and
a user-actuated scroll wheel;
wherein the control system is further configured to move the unloading conveyor in a first swing direction in response to actuation of the scroll wheel in a first scroll direction, and to move the unloading conveyor in a second swing direction in response to actuation of the scroll wheel in a second scroll direction opposite to the first scroll direction;
wherein the control system is operable in a manual mode wherein movement of the unloading conveyor is stopped by the control system in response to actuation of the scroll wheel being stopped, and operable in an automatic mode wherein movement of the unloading conveyor is continued by the control system after actuation of the scroll wheel is stopped and until detection by the control system that the unloading conveyor has reached a predefined position or that actuation of the scroll wheel has restarted;
wherein the scroll wheel device is configured to generate a scroll speed signal in response to actuation of the scroll wheel, and the scroll speed signal has a value that is representative of the scroll speed;
wherein the control system is further configured to control the movement of the unloading conveyor dependent upon the scroll speed signal;
wherein the control system is further configured to operate in the manual mode when it determines that the scroll speed is below a predetermined first threshold value; and
wherein the control system is configured to initiate the automatic mode when it determines that the scroll speed is above the predetermined first threshold value.

19. A method of controlling a harvesting machine and a crop-receiving cart unit during an unload event, wherein the harvesting machine comprises an unloading conveyor pivotably mounted to a frame for pivoting movement through a movement range defined between first and second end positions; and a control system configured to produce controlled movement of the unloading conveyor within the movement range in response to a user input signal, wherein the control system comprises a scroll wheel device arranged to generate the user input signal,
wherein the control system is operable in a cart control mode wherein cart positioning commands are generated in dependence upon user input signals generated by the scroll wheel device.

20. The method of claim 19, wherein the control system comprises a press-actuated control switch, wherein when in the cart control mode with the control switch in a non-actuated state longitudinal cart positioning commands are generated in dependence upon user input signals generated by the scroll wheel device, and wherein when in the cart control mode with the control switch in an actuated state, transverse cart positioning commands are generated in dependence upon user input signals generated by the scroll wheel device.

* * * * *